(12) United States Patent
Carney et al.

(10) Patent No.: US 12,719,254 B2
(45) Date of Patent: Aug. 25, 2026

(54) WIRE HOLDER

(71) Applicant: SLINGCO LIMITED, Rawtenstall (GB)

(72) Inventors: Bradford L. Carney, Tyrone, GA (US); John H. Hamrick, Rawtenstall (GB); Sandile Mpande, Rawtenstall (GB); Paul Pomeroy, Rawtenstall (GB)

(73) Assignee: SLINGCO LIMITED, Rawtenstall (GB)

( * ) Notice: Subject to any disclaimer, the term of this patent is extended or adjusted under 35 U.S.C. 154(b) by 6 days.

(21) Appl. No.: 18/439,438

(22) Filed: Feb. 12, 2024

(65) Prior Publication Data

US 2025/0260218 A1 Aug. 14, 2025

(51) Int. Cl.
*H02G 7/05* (2006.01)

(52) U.S. Cl.
CPC .................................... *H02G 7/05* (2013.01)

(58) Field of Classification Search
CPC ....................................................... H02G 7/05
USPC .......................................................... 248/61
See application file for complete search history.

(56) References Cited

U.S. PATENT DOCUMENTS 2,876,027 A * 3/1959 Sulmonetti ........... F16B 7/0493 403/53
3,966,240 A * 6/1976 Enomoto ................ F16L 23/10 285/422
4,101,103 A * 7/1978 Mooney .................... F16L 3/11 248/62
4,669,688 A * 6/1987 Itoh ........................... F16L 3/23 24/297
4,783,029 A * 11/1988 Geppert .................... F16L 3/18 248/65
5,961,081 A * 10/1999 Rinderer .................. H02G 3/32 248/68.1
6,003,852 A * 12/1999 Kawamura ...... H01B 13/01209 269/287
6,688,569 B1 * 2/2004 Weiss ........................ B25B 5/10 403/321
6,923,407 B2 * 8/2005 Takeuchi ................ F16B 21/02 248/68.1
7,210,658 B2 * 5/2007 Carrera ............ H01B 13/01209 248/65
7,883,121 B2 * 2/2011 Henry ..................... F16L 23/10 285/410
7,963,487 B2 * 6/2011 Saltenberger ......... F16L 3/1075 248/68.1
8,840,071 B2 * 9/2014 Oh ........................ F16L 3/1075 248/65

(Continued)

*Primary Examiner* — Anita M King
(74) *Attorney, Agent, or Firm* — Oliff PLC

(57) ABSTRACT

Wire holders for overhead electrical wires (e.g. powerlines) are configured to be used with a temporary extension arm. Temporary extension arms and wire holders are used in adverse weather conditions which can be dangerous if a live wire escapes the wire holder. Proposed is a wire holder having a latch mounted to a first upright wherein the latch extends entirely between the first upright and a second upright when in a closed (first) position. When in the closed position, a wire can be held captive between the first upright, the second upright, the latch and a body of the wire holder. The latch is movable to an open (second) position, which allows the wire to be placed or removed from between the first upright and the second upright.

20 Claims, 10 Drawing Sheets

(56) References Cited

U.S. PATENT DOCUMENTS 11,881,694 B2 * 1/2024 Wilson .................. H02G 3/263

* cited by examiner

WIRE HOLDER

TECHNICAL FIELD

The present invention relates to an overhead electrical wire holder, for example a powerline holder, and particularly, although not exclusively, to a wire holder for a temporary extension arm.

BACKGROUND

Temporary extension arms (also known as temporary crossarms or hot arms) are typically used to temporarily hold overhead electrical wires while work is performed in the vicinity of the electrical wires. The electrical wires may be electrical cables for transmitting and distributing power (e.g. overhead powerlines) or information (e.g. telephone or television cables).

A temporary extension arm can be attached to a utility pole (for example the cross arm or main column of a utility pole) such that it extends away from the utility pole. A temporary extension arm is usually a round pole. It can be made from an insulating material e.g. fibreglass. Such arms may be referred to as temporary insulated extension arms. One or more wire holders are attached to the end of the temporary extension arm such that, when the temporary extension arm is attached to a utility pole, the one or more wire holders are distant from the utility pole. Lineworkers can move an electrical wire from the utility pole and place it in the wire holder on the temporary extension arm. This can be done without stopping the operation of the wire so that work can be carried out on the utility pole, or in the vicinity of the utility pole, whilst the electrical wire is still operational e.g. whilst the wire is still live.

FIG. 1 shows a known wire holder on the end of a temporary extension arm 2. The wire holder 1 is attached to the extension arm 2 via a clamp 3 which is secured using a fastener 4. The body 5 of the wire holder 1 supports a frame 6 having a first upright 7 and a second upright 8 opposing the first upright 7. The first upright 7 and the second upright 8 are configured to receive a wire or cable therebetween through an opening 9 between the first upright 7 and the second upright 8 at an end opposite the body 5. The frame 6 is a U-shaped frame, with the base of the "U" supported by the body 5. Other wire holders may have a generally U- or V-shaped frame.

The wire holder 1 has a longitudinal axis 90 which extends in a longitudinal direction. The longitudinal direction is substantially perpendicular to the direction of extension of the temporary extension arm 2. In use, the longitudinal direction is substantially vertical. The first upright 7 and the second upright 8 extend generally in the longitudinal direction. The first upright 7 and the second upright 8 extend from a respective side of the body (facing a respective direction substantially perpendicular to the longitudinal direction) and each comprise a respective curve such that they extend in a substantially longitudinal direction.

The wire holder 1 shown in FIG. 1 has an insulator 13 which is located between the body 5 and the clamp 3. Some wire holders may not include an insulator such that the body 5 is directly connected to the clamp 3.

A latch 10 is pivotably attached to the first upright 7 at a pivot 14 proximate the distal end of the first upright 7. The latch 10 is movable (e.g. pivotable) between a first position (e.g. a closed position) in which the latch 10 extends from the first upright 7 towards the second upright 8, and a second position (e.g. an open position) in which the latch extends towards the body 5 of the wire holder 1.

The latch is mounted on a first external side surface 16 of the first upright 7. The first external side surface 16 faces a direction substantially perpendicular to the longitudinal direction (out of the page in FIG. 1). The latch 10 at least partially overlays the first upright 7.

The latch 10 comprises a handle 11 which extends away from the first upright 7 in a direction away from the second upright 8. The latch 10 and the handle 11 form a unitary component. The handle 11 is used to move the latch 10 between the first position and the second position. The handle 11 may have a hole 12. The hole 12 may allow the handle 11 to be operated (and thus the latch 10 moved) using a separate tool e.g. a (long-handled) hooked tool. This means that a lineworker can operate the handle 11 (and thus move the latch 10 between the first position and the second position) without directly holding the handle 11. This ensures that the lineworker is further protected from a live wire in the wire holder and that the handle 11 can be operated from a distance (e.g. from the ground).

FIG. 1 shows the wire holder 1 with the latch 10 in the first position. In the first position, the latch 10 extends substantially perpendicular to the longitudinal direction. In the first position there is a small gap between the latch 10 and the second upright 8. Lineworkers are not supposed to remove a wire from the wire holder 1 when the latch 10 is in the first position.

FIG. 2 shows the wire holder 1 with the latch 10 in the second position. In order to move the latch 10 shown in FIG. 1 to the second position shown in FIG. 2, the latch 10 is rotated anti-clockwise about the pivot 14. When the latch 10 is in the second position, the gap between the latch 10 and the second upright 8 is greater than in the first position such that in the second position, a wire may pass through the opening 9 of the wire holder 10. Further, in the second position, the latch 10 is substantially aligned with the first upright 7 (e.g. the latch 10 and the first upright 7 are substantially parallel). The latch 10 overlays more of the first upright when in the second position.

In use, the temporary extension arm 2 is attached to a utility pole (not shown in FIG. 1 or FIG. 2) such that it extends in a direction substantially horizontal with the ground. A wire is lifted from its permanent attachment point on the utility pole. The latch 10 of the wire holder is moved to the second position and the wire is placed between the first upright 7 and the second upright 8 (via the opening 9). The latch 10 is then moved from the second position to the first position such that the wire is captured between the first upright 7, the second upright 8, the body 5 and the latch 10 (the wire extends through the space defined by these components). To return the wire to its permanent fixing on the utility pole, the latch 10 is moved from the first position to the second position, and the wire is removed from the wire holder 1 via the opening 9.

Temporary extension arms and wire holders are used in adverse weather conditions. Wires may move in high winds and escape the wire holder. This can be particularly dangerous for the lineworkers when the wire is still operational. It is desirable to improve the safety and reliability of wire holders. The present invention has been devised in light of the above considerations.

SUMMARY

At its most general, the present disclosure relates to a wire holder having a latch mounted to a first upright, wherein the latch extends entirely between the first upright and a second upright when in a closed (first) position. In particular, the latch may overlap the second upright. Advantageously, a closed boundary comprising the latch, first upright and the second upright is provided around a wire which is held captive in the wire holder so that even in adverse weather conditions, the risk of a wire escaping from the wire holder is reduced (compared to known wire holders).

In a first aspect, there is provided a wire holder for a temporary extension arm comprising: a body, a first upright extending away from the body, a second upright extending away from the body opposing the first upright, and a latch pivotably mounted to the first upright and configured to be reversibly movable between a first position and a second position, wherein in the first position the latch extends entirely between the first upright and the second upright such that a wire can be held captive between the first upright, the second upright, the body and the latch, and in the second position, a gap is provided between the latch and the second upright such that a wire may pass through the gap and into or out of the wire holder.

By providing a wire holder according to the first aspect, the first upright, the second upright, the body and the latch may form a closed boundary around a wire which is held captive in the wire holder. Consequently, even in adverse weather conditions (e.g. high winds), the risk of a wire escaping from the wire holder is reduced (compared to known wire holders).

The wire holder may comprise a frame comprising the first upright and the second upright. The wire holder may have features known in the art. For example, the first upright and the second upright may extend in a longitudinal direction, in the first position the latch may extend in a direction substantially perpendicular to the longitudinal direction and/or the latch may be pivotably mounted proximate a distal end of the first upright. By way of further example, the latch may be pivotably mounted to the first upright at a pivot. The pivot may be a pin which e.g. extends through the latch and the first upright. The pivot may be spaced from the distal end of the first upright.

In use, the wire holder may be attached to a temporary extension arm. The temporary extension arm may be attached to a utility pole as is known in the art. To secure a wire in the wire holder, the latch of the wire holder is moved to the second position and a wire is placed between the first upright and the second upright, then the latch is moved from the second position to the first position such that the wire is captured between the first upright, the second upright, the body and the latch.

In the first position, the latch may extend between the first upright and the second upright such that the latch overlaps the second upright. In other words, in the first position, a portion of the latch may extend adjacent to the second upright (e.g. a surface of the second upright such as a first external side surface). By providing a wire holder having a latch which overlaps the second upright, even if the latch or wire were to move slightly as a result of adverse weather conditions, a closed boundary may be maintained around a wire which is held captive in the wire holder. Further, the second upright may provide support for the latch when in the first position such that the latch maintains alignment (e.g. in a transverse direction) with the first upright and the second upright. In particular, it is known in the technical field to operate the latch using a long-handled tool, therefore, the second upright provides support for the latch so that it may be more easily operated by a long-handled tool.

The second upright may comprise a stopping surface wherein, in the first position, the latch is configured to abut the stopping surface. The stopping surface may be at a distal end of the second upright. The stopping surface may face in a longitudinal direction e.g. substantially towards the body of the wire holder (substantially downwards when in use). In the first position, a longitudinally facing surface of the latch (e.g. facing away from the body of the wire holder) may be configured to abut the stopping surface. The stopping surface may be spaced from the distal end of the second upright such that, in the first position, the end of the latch may be spaced from the distal end of the second upright.

By providing a stopping surface, the latch may be prevented from opening when in the first position e.g. in a direction away from the second position. This may ensure that a wire can be held captive in the wire holder without escaping. Further, the stopping surface may allow a lineworker to easily locate the latch in the first position when in use.

The second upright may comprise a stopper which comprises the stopping surface. The stopper may extend from a surface (e.g. the first external side surface) of the second upright in a transverse direction.

The second upright may comprise a second upright slot configured to receive a portion of the latch when the latch is in the first position. The latch may be configured to extend into the second upright slot. The opening of the second upright slot may face the first upright. For example, the second upright may comprise a second side surface facing the first upright. The second upright slot may be on the second side surface such that the opening of the second upright slot faces the first upright. The second upright slot may extend through (e.g. entirely through) the second upright. The second upright slot may have a length in a direction substantially parallel to the longitudinal direction. The second upright slot may have a width (perpendicular to the length). The width of the second upright slot may be substantially equal to, or greater than, the thickness of the latch. The thickness of the latch is in a direction perpendicular to the longitudinal direction and perpendicular to the direction of extension of the latch.

The second upright slot may comprise the stopping face. The second upright slot may comprise an end face, distant from the body of the wire holder. The end face may be the stopping face (optionally having any of the features and functions of the stopping face as described above except where clearly impermissible). For example, the end face of the second upright slot may be spaced from the distal end of the second upright.

The second upright slot may extend towards the body of the wire holder such that, as the latch moves from the first position to the second position, the latch may be partially within the second upright slot for part of the travel between the first position and the second position.

By providing a second upright slot, the latch may be securely held within the second upright when in the first position. As a result, a wire may be securely held captive by the wire holder. Further, the second upright slot ensures that the latch stays aligned with the first upright and/or the second upright when in a first position and when moving between the first position and the second position. Reducing the freedom of movement of the latch reduces the chances that a wire may work its way out of the wire holder. Moreover, the end face of the second upright slot may provide a stopping face to ensure that the latch is easily located in the first position.

The latch may be mounted on the first upright e.g. on a first external side surface of the first upright. The latch may be spaced from the first upright by a spacer element (e.g. a washer). The first external side surface of the first upright and the first external side surface of the second upright face the same direction. The respective first external side surfaces of the first upright and the second upright may be substantially aligned (e.g. on the same plane). In embodiments where the latch overlaps the second upright, a portion of the latch may at least partially oppose the first external side surface of the second upright.

In other exemplary embodiments, the first upright comprises a first upright slot and the latch is pivotably mounted in the first upright slot. Here, suitably the opening of the first upright slot faces the second upright. For example, the first upright may comprise a second side surface which faces the second upright. The first upright slot may be on the second side surface such that the opening of the first upright slot faces the second upright. The first upright slot may extend through (e.g. entirely through) the first upright. The first upright slot may have a length in a direction substantially parallel to the longitudinal direction. The first upright slot may have a width (perpendicular to the length). The width of the first upright slot may be substantially equal to, or greater than, the thickness of the latch.

The first upright slot may comprise an end face, distant from the body of the wire holder. The end face may be spaced form the distal end of the first upright.

The first upright slot may extend towards the body of the wire holder such that, when the latch is in the second position, the latch may extend within the first upright slot (e.g. at least partially). As such, the length of the first upright slot may be substantially equal to, or greater than, the length of the latch between the pivot and the distal end of the latch.

The pivot may be located in the first upright slot. In other words, the pivot may extend through the first upright slot. The pivot may extend through a portion of the latch located in the first upright slot. In some embodiments, the pivot may extend from the first external side surface of the first upright, through the first upright slot and through the latch and out the opposite side of the first upright.

By providing a first upright slot in the first upright in which the latch is mounted, the alignment of the latch with respect to the frame of the wire holder may be maintained as the latch is moved from the first position to the second position. This may prevent a wire escaping the wire holder (e.g. in a direction having a sideways component) before the lineworker is ready to remove the wire.

In some embodiments, the latch comprises a handle. The handle extends from the pivot in a direction away from the second upright. Alternatively or in addition, the handle may extend towards the body of the wire holder. Here, the portion of the latch which extends from pivot towards the second upright may be referred to as the closure portion of the latch. The handle may extend away from the closure portion of the latch at an angle. For example, at an angle between about 90° and about 180° e.g. between about 100° and about 170° e.g. between about 110° and about 160° e.g. between about 120° and about 140°.

The handle may comprise an aperture. The aperture may extend through the handle in a transverse direction. The aperture is configured to receive a hooked tool such that the latch can be operated (e.g. moved between the first position and the second position) with the hooked tool as is known in the art. The aperture may be a substantially circular hole. The aperture may be provided at a distal end of the handle (e.g. distant from the pivot). The width of the handle may be greater at the distal end than proximate the pivot (the width being perpendicular to the direction of extension and the thickness of the latch). For example, a dimension (e.g. the diameter) of the aperture may be greater than the width of the handle proximate the pivot. The handle may comprise a rim surrounding the aperture. The rim may have a greater thickness than the rest of the latch.

In some embodiments, the handle comprises more than one aperture. For example, the handle may comprise 2 or more, 3 or more, 4 or more, or 5 or more apertures. At least one of the more than one apertures may be the aperture described above (e.g. configured to receive a hooked tool as described above). The more than one apertures may each extend through the handle in a transverse direction.

By providing a handle having more than one aperture, the weight of the wire holder may be reduced and the amount of material required to manufacture the wire holder may be reduced.

In some exemplary embodiments, a distal portion of the handle (e.g. distant from the pivot) overlaps the first upright when the latch is in the first position. In other words, when the latch is in the first position, a portion of the handle may extend adjacent to the first upright (e.g. a surface of the first upright such as the first external side surface). The distal portion of the handle may comprise a portion of the rim surrounding the aperture.

The first upright may comprise a recess configured to receive a distal portion of the handle when the latch is in the first position. For example, the first upright may comprise a third side surface (opposite the second side surface) which faces away from the second upright. The third side surface may comprise the recess. The recess may be a concave recess. The recess may be configured to conform to the shape of the distal end of the handle e.g. the rim around the aperture. In embodiments having a slot in the first upright, the recess may extend either side of the slot (in a transverse direction).

By providing wire holder where, when the latch is in the first position, a portion of the handle overlaps the first upright or where the first upright comprises a recess to receive a distal portion of the handle, the overall size of the wire holder may be reduced. This may improve (e.g. reduce) the size of packaging and may reduce the likelihood of the handle being knocked or otherwise inadvertently operated when a wire is held captive in the wire holder.

The first upright may comprise a stopping surface wherein, in the second position, the latch (e.g. the handle of the latch) is configured to abut the stopping surface. The stopping surface may be at a distal end of the first upright. The stopping surface may face towards the body of the wire holder. A surface of the handle which, in the first position, faces away from the first upright may be configured to abut the stopping surface when the latch is in the second position. The stopping surface may extend at an angle to the longitudinal direction. The angle may be substantially the same as the angle at which the handle extends away from the closure portion of the latch.

By providing a stopping surface on the first upright, a lineworker may be able to more easily locate the latch in the second position in order to place or remove a wire from the wire holder. Further, the linework may be less likely to lose control of the position of the latch within the frame.

The first upright may comprise a stopper which comprises the stopping surface. The stopper may extend from a surface (e.g. the first external side face) of the first upright in a transverse direction.

The stopping surface may be the end face of the slot in the first upright.

As described herein, in some exemplary embodiments, the first upright and the second upright may each comprise a respective stopping surface. For example, the first upright and the second upright may each comprise a respective one of a stopper or a slot comprising said respective stopping surface.

The first upright and/or the second upright may each comprise a respective strengthening member. The strengthening member may extend from the first upright/second upright in a transverse direction (e.g. from a side surface of the first upright/second upright such as the first external side surface). The strengthening member may extend (partially or entirely) along the first upright/second upright. The strengthening member may extend from the body of the wire holder. The strengthening member may extend across the entire width of the first upright/second upright (e.g. the width of the strengthening member may be substantially the same as the width of the first upright). Alternatively, the width of the strengthening member may be less than the width of the first upright/second upright. In these embodiments, the strengthening member may be located on the first upright/second upright opposing the other upright (either the second upright or the first upright), e.g. proximate the second side surface. The strengthening member may resemble a flange.

In embodiments having a strengthening member on the first upright, the strengthening member may be on the side of the first upright on which the latch is mounted. For example, the strengthening member may be on the first external side surface of the first upright. In these embodiments, said strengthening member may extend partially along the first upright such that there is a gap between the strengthening member (e.g. the distal end of the strengthening member) and the distal end of the first upright (e.g. the stopper on the first upright). The gap may be configured to receive the latch when in the second position. The latch may be mounted in the gap.

By providing a gap between the strengthening member and the distal end of the first upright, the first upright may be strengthened but at the same time, the latch may be able to pass freely across the first external side surface of the first upright when moved between the first position and the second position. Further, the first upright may be strengthened whilst reducing the amount of material used to manufacture the wire holder.

In embodiments having a strengthening member on the second upright, the strengthening member may be on the same side of the second upright as the latch. For example, the strengthening member may be on the first external side surface of the second upright. In these embodiments, said strengthening member may extend partially along the second upright such that there is a gap between the strengthening member (e.g. the distal end of the strengthening member) and the distal end of the second upright (e.g. the stopper on the second upright). The gap may be configured to accommodate the latch when the latch is in the first position and as the latch moves between the first position and the second position.

By providing a gap between the strengthening member and the distal end of the second upright, the second upright may be strengthened but at the same time, the latch may be able to pass freely across the first external side surface of the second upright when moved between the first position and the second position. Further, the second upright may be strengthened whilst reducing the amount of material used to manufacture the wire holder.

The first upright and/or the second upright may each comprise a respective pair strengthening members on opposite sides. For example, a strengthening member on the first external side surface and a strengthening member on a side opposite the first external side surface. One or both of the pair of strengthening members may have any of the features described above except where mutually exclusive or clearly impermissible.

The wire holder may comprise cast aluminium. For example, the wire holder may be machined cast aluminium.

The distance between the first upright and the second upright may be between about 6 mm and about 64 mm, e.g. between about 8 mm and about 62 mm, e.g. between about 10 mm and about 60 mm e.g. between about 12 mm and about 58 mm e.g. between about 14 mm and about 56 mm e.g. between about 14 mm and about 56 mm e.g. between about 16 mm and about 54 mm e.g. between about 18 mm and about 52 mm e.g. between about 20 mm and about 50 mm e.g. between about 22 mm and about 48 mm e.g. between about 24 mm and about 46 mm e.g. between about 26 mm and about 44 mm e.g. between about 28 mm and about 42 mm e.g. between about 30 mm and about 40 mm e.g. between about 32 mm and about 38 mm e.g. between about 34 mm and about 36 mm. In some embodiments, the distance between the first upright and the second upright may be about 42 mm.

The wire holder has a height (e.g. from the bottom of the body to the top of the first upright and/or second upright) which may be between about 50 mm and about 180 mm e.g. between about 55 mm and about 175 mm e.g. between about 60 mm and about 170 mm e.g. between about 65 m and about 165 mm e.g. between about 70 mm and about 160 mm e.g. between about 75 mm and about 155 mm e.g. between about 70 mm and about 150 mm e.g. between about 75 mm and about 145 mm e.g. between about 80 mm and about 140 mm e.g. between about 85 mm and about 135 mm e.g. between about 90 mm and about 130 mm e.g. between about 95 mm and about 125 mm e.g. between about 100 mm and about 120 mm e.g. between about 105 mm and about 115 mm. In some embodiments, the height may be 163 mm.

As is known in the art, suitably the wire holder is configured to be attached to a temporary extension arm. For example, the wire holder may be configured to be removably attachable to the temporary extension arm. The wire holder may be configured to be movable (e.g. repositionable) on the temporary extension arm. The wire holder may be configured to be replaceable on a temporary extension arm. For example, the wire holder may comprise a clamp e.g. at an end opposite the first upright and the second upright, the clamp being configured to releasably clamp the wire holder to a temporary extension arm.

By providing a wire holder which is removably attachable to or replaceable or repositionable on a temporary extension arm, the lineworker may be able to change (e.g. damaged) wire holders or reposition the wire holder to suit the working situation.

The wire holder optionally comprises an insulator e.g. attached to the body opposite the frame. The clamp may be attached to the insulator at an end opposite the body. The insulator is configured to provide insulation between the wire and the temporary extension arm such that current leakage from the wire is prevented.

In a second aspect there is provided a system comprising a temporary extension arm and a wire holder according to the first aspect attached to the temporary extension arm.

As will be appreciated, the wire holder may be removably attached to the temporary extension arm and/or replaceable on the temporary extension arm. The wire holder may be (e.g. removably) clamped to the temporary extension arm. The wire holder may be movably located on (e.g. attached to) the temporary extension arm.

The system may comprise more than one wire holders according to the first aspect.

In a third aspect there is provided a kit of parts comprising: one or more wire holders according to the first aspect; and a temporary extension arm.

The invention includes the combination of the aspects and preferred features described except where such a combination is clearly impermissible or expressly avoided.

SUMMARY OF THE FIGURES

Embodiments of the disclosure will now be discussed with reference to the accompanying figures in which.

DETAILED DESCRIPTION

Figure 1:
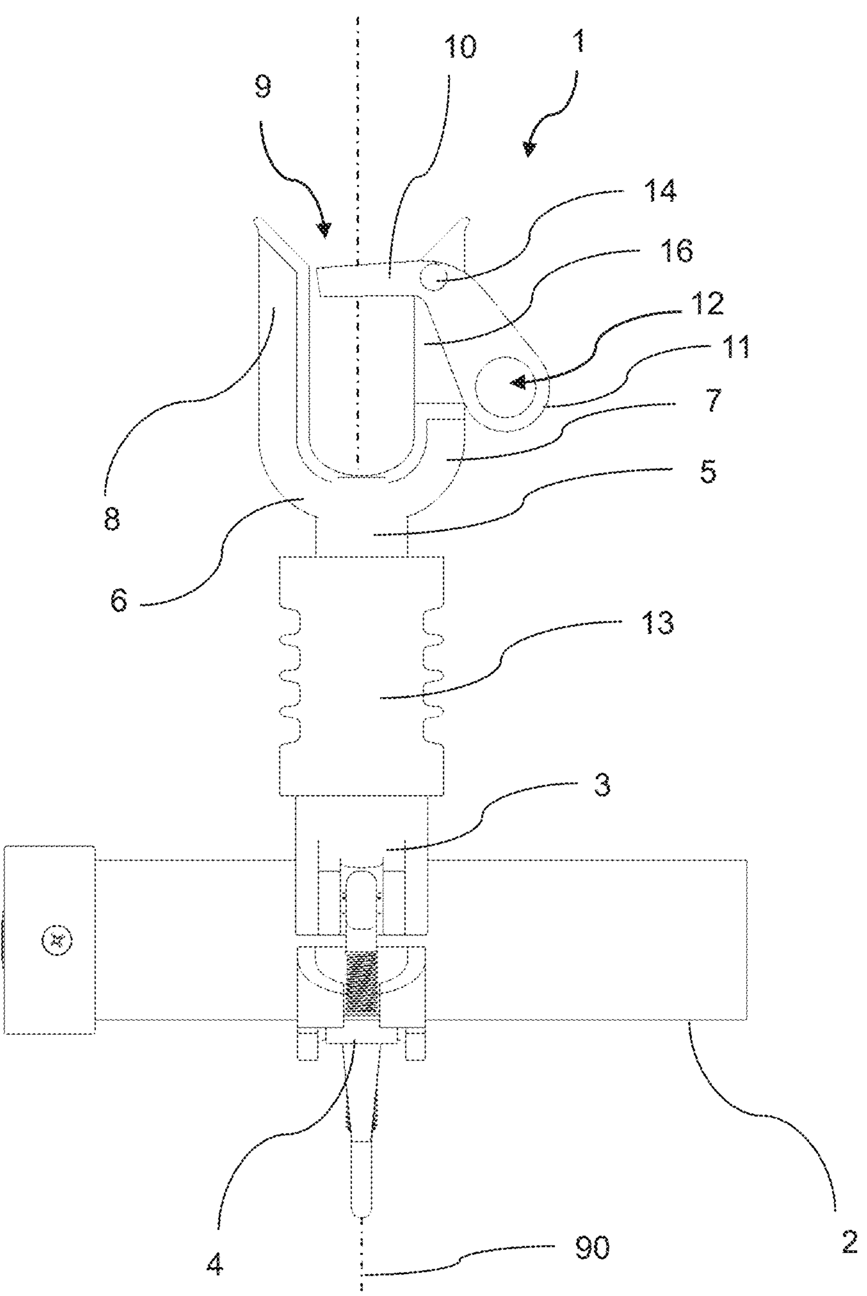
FIG. 1. shows a known wire holder according to the prior art with the latch in the first position.
Figure 2:
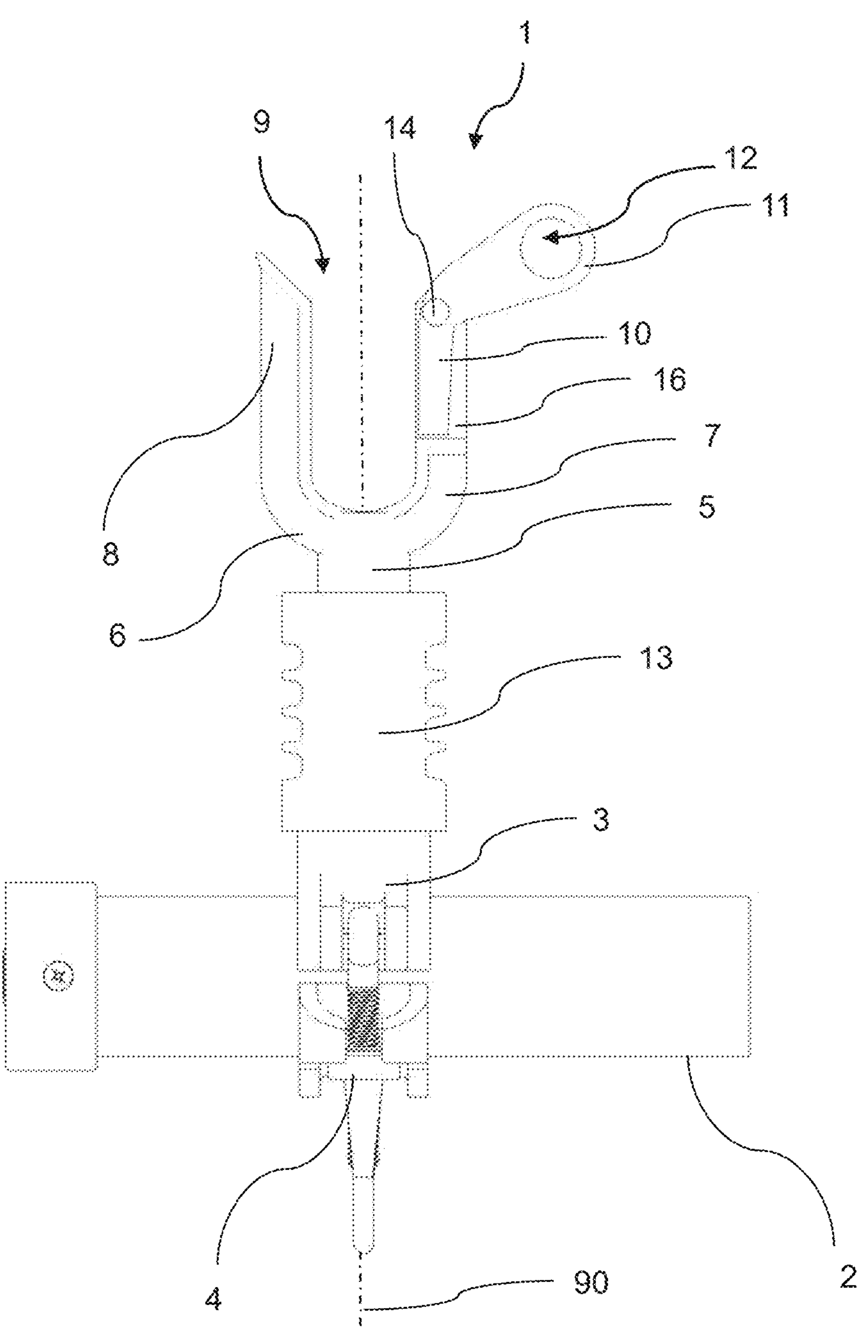
FIG. 2. shows a known wire holder according to the prior art with the latch in the second position.
Figure 3:
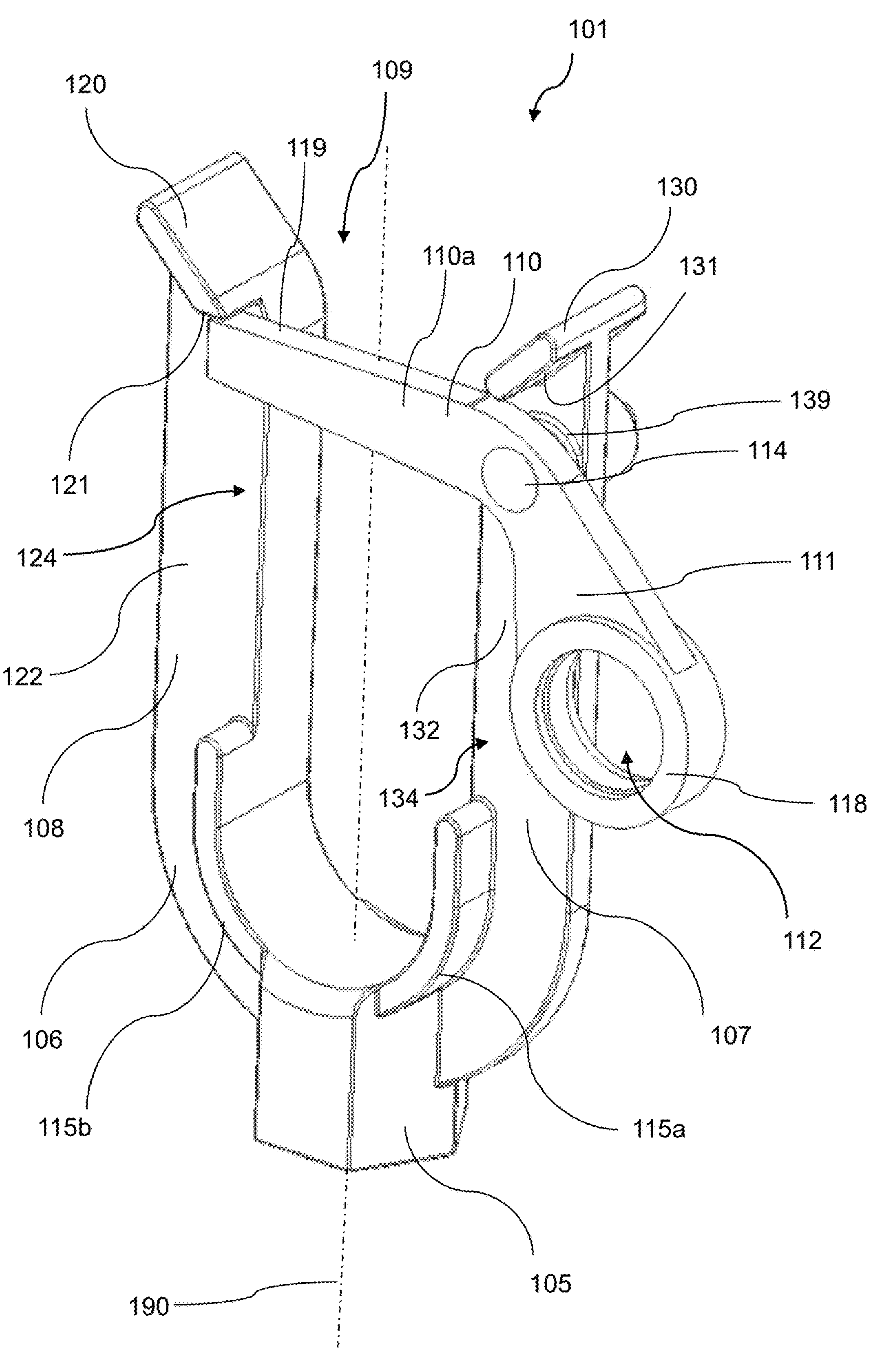
FIG. 3. shows a perspective view of an exemplary wire holder.
Figure 4:
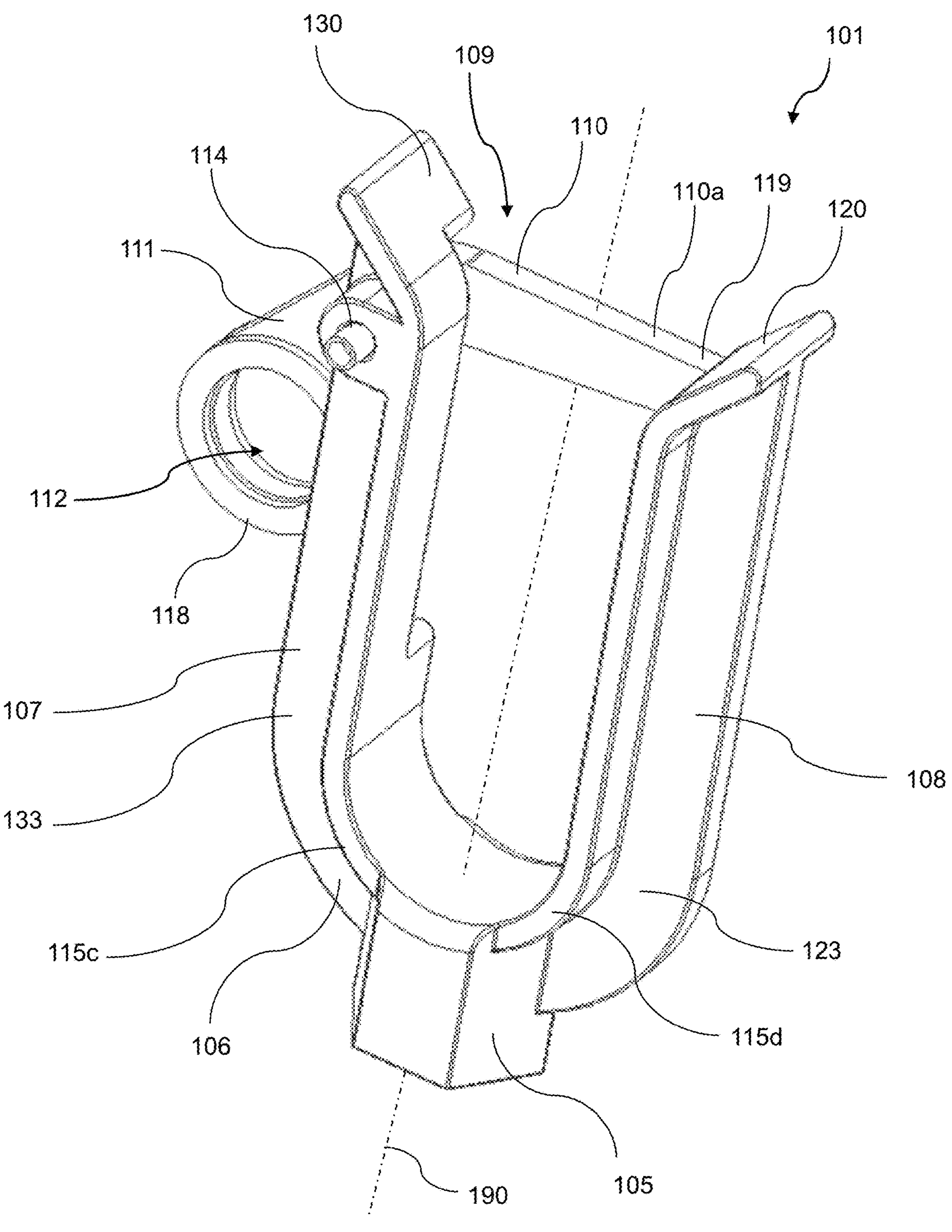
FIG. 4. shows a perspective view of the wire holder shown in FIG. 3 from the opposite side.

FIG. 3 shows a perspective view of an exemplary wire holder. An optional clamp and insulator are omitted for clarity. By way of example, the clamp and insulator of the known wire holder 1 shown in FIG. 1 may be used with first embodiment of the wire holder shown in FIGS. 3 to 6. Other known clamps and insulators may also be used.

FIG. 3 shows a wire holder 101 having a body 105, a first upright 107 extending away from the body 105 and a second upright 108 extending away from the body 105 and opposing the first upright 107. A latch 110 is pivotably mounted to the first upright 107. The body 105 has a hexagonal cross-section in the longitudinal direction.

The first upright 107 and the second upright 108 form a frame 106 which is a U-shaped frame having an opening 109 between the first upright 107 and the second upright 108 at an end opposite the body 105. The opening 109 is tapered. The wire holder 101 has a longitudinal axis 190 which extends in a longitudinal direction. The first upright 107 and the second upright 108 respectively extend in the longitudinal direction from opposing sides of the body 105 (which face in a direction substantially parallel to the longitudinal direction). The first upright 107 and the second upright 108 each comprise a respective curve proximate the body 105 such that they extend substantially in the longitudinal direction.

The latch 110 is pivotably mounted at a pivot 114 which is a pin that extends through the latch 110 and the first upright 107. The pivot 114 is spaced from the distal end of the first upright 107.

The second upright 108 comprises a stopper 120 having a stopping surface 121 which faces towards the body 105 of the wire holder 101. The stopper 120 and the stopping surface 121 are at the distal end of the second upright 108. The stopper 120 extends from the first external side surface 122 of the second upright 108 in a transverse direction (substantially perpendicular to the longitudinal direction).

The first upright 107 also comprises a stopper 130 having a stopping surface 131 which faces towards the body 105 of the wire holder 101 and which extends at an angle of about 45 degrees to the longitudinal direction. The stopper 130 and the stopping surface 131 are at the distal end of the first upright 107. The stopper 130 extends from the first external side surface 132 of the first upright 107 in a transverse direction (substantially perpendicular to the longitudinal direction).

The first external side surface 122 of the second upright 108 and the first external side surface 132 of the first upright 107 face the same direction and are substantially aligned. The latch 110 is mounted on the first external side surface 132 of the first upright 107 and is spaced from the first upright 107 by a spacer element 139.

The latch 110 comprises a handle 111 which extends from the pivot 114 in a direction away from the second upright 108 and towards the body 105 of the wire holder 101. The portion of the latch 110 which in FIG. 3 extends from the pivot 114 towards the second upright 108 may be referred to as the closure portion **110*a* of the latch 110. The handle 111 and the closure portion 110*a* extend away from each other at an angle of about 95 degrees to about 132 degrees. The angle between the stopping surface 131 on the first upright 107** and the longitudinal direction is about 45 degrees.

The handle 111 comprises an aperture 112 which is a circular hole extending through the handle 111 in a transverse direction. The aperture 112 is at a distal end of the handle 111. The width of the handle 111 is greater at the distal end than proximate the pivot 114 such that a diameter of the aperture 112 is greater than the width of the handle 111 proximate the pivot 114. The aperture comprises a rim 118 which is thicker than the rest of the handle 111.

Figure 5:
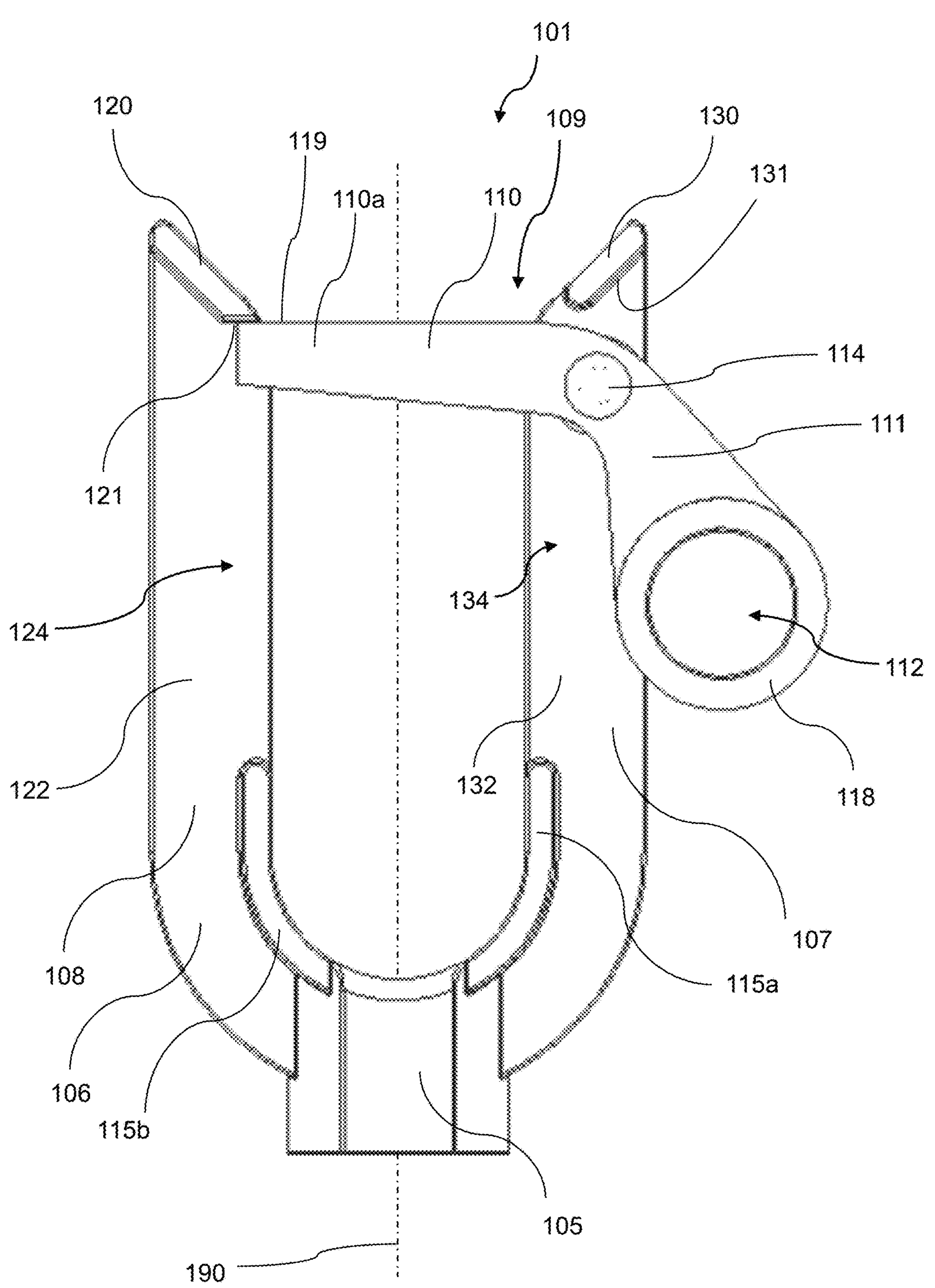
FIG. 5. shows a front view of the wire holder shown in FIG. 3 where the latch is in the first position.

As seen in FIG. 5, a portion of the distal end of the handle 111 including the rim 118 of the aperture 112 overlaps the first upright 107 when the latch 110 is in the first position such that the portion of the distal end of the handle 111 opposes the first external side face 132 of the first upright 107.

The first upright 107 comprises a pair of strengthening members **115*a*, 115*c* on opposite sides. One strengthening member 115*a* is provided on the first external side surface 132 and another strengthening member 115*c* is provided on a side 133 opposite the first external side surface 132 (visible in FIG. 4). The width of the strengthening members 115*a*, 115*c* on the first upright 107 is less than the width of the first upright 107 and the strengthening members 115*a*, 115*c* are on a side of the first upright 107 proximate the second upright 108**.

The strengthening member **115*a* on the first external side surface 132 is a flange that extends out from the first upright 107 in a transverse direction and extends partially along the first upright 107 from the body 105 of the wire holder 101**.

As a result, a gap 134 is provided between the strengthening member 115*a* and the stopper 130. The latch 110 is mounted within the gap 134. The strengthening member 115*c* on a side 133 opposite the first external side surface 132 extends out from the first upright 107 in a transverse direction and extends entirely along the first upright 107 from the body 105 to the distal end of the first upright 107.

Similarly, the second upright 108 comprises a pair of strengthening members 115*b*, 115*d* on opposite sides. One strengthening member 115*b* is provided on the first external side surface 122 and another strengthening member 115*d* is provided on a side 123 opposite the first external side surface 122 (visible in FIG. 4). The width of the strengthening members 115*b*, 115*d* on the second upright 108 is less than the width of the second upright 108 and the strengthening members 115*b*, 115*d* are on a side of the second upright 108 proximate the first upright 107.

The strengthening member 115*b* on the first external side surface 122 is a flange that extends out from the second upright 108 in a transverse direction and extends partially along the second upright 108 from the body 105 of the wire holder 101. As a result, a gap 124 is provided between the strengthening member 115*b* and the stopper 120. The strengthening member 115*d* on a side 123 opposite the first external side surface 122 extends out from the second upright 108 in a transverse direction and extends entirely along the second upright 108 from the body 105 to the distal end of the second upright 108.

Figure 6:
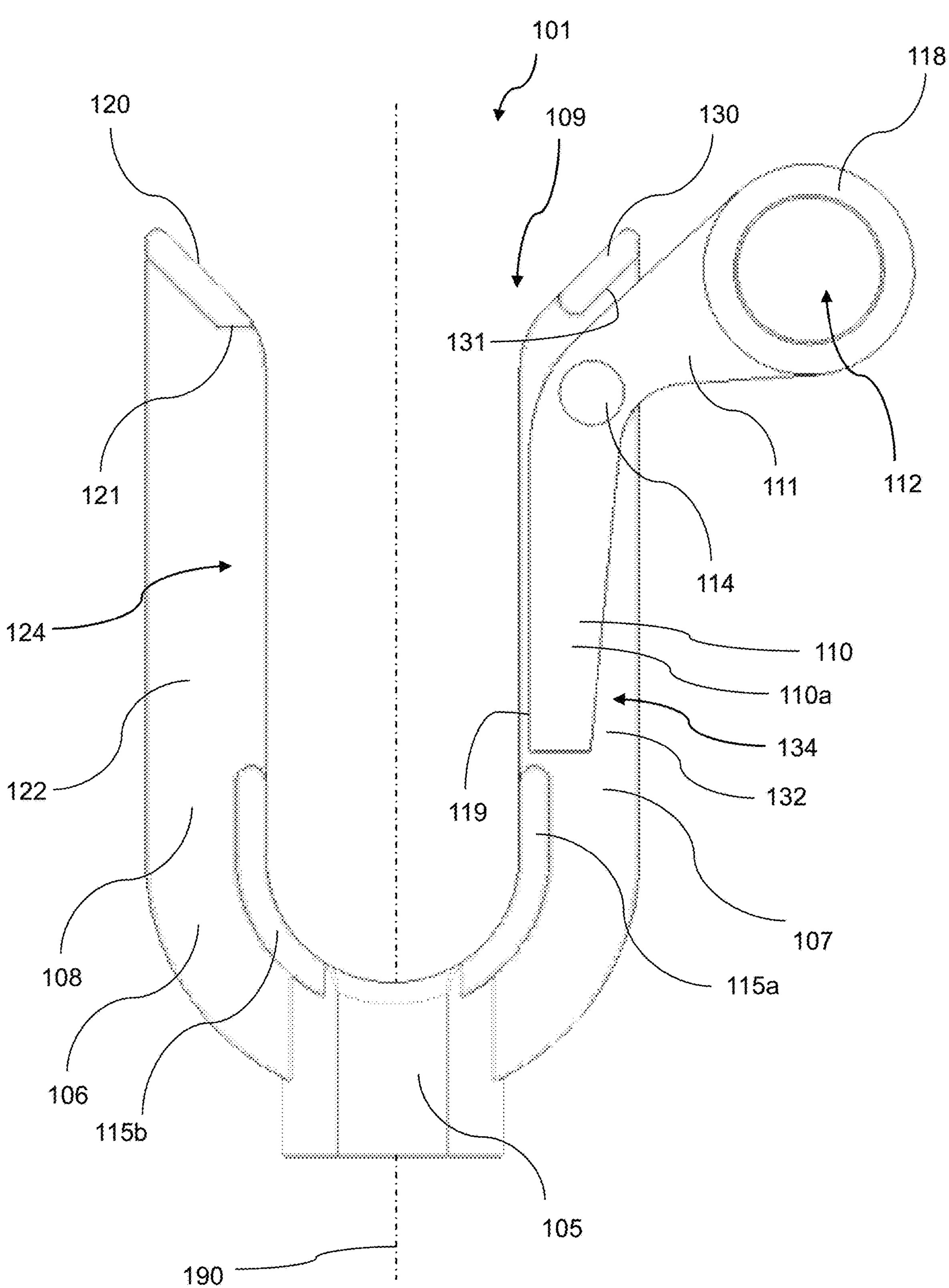
FIG. 6. shows a front view of the wire holder shown in FIG. 3 where the latch is in the second position.

The latch 110 of the wire holder 101 is pivotable between a first position (shown in FIGS. 3 to 5) and a second position (shown in FIG. 6). In the first position, the latch 110 extends from the first upright 107 towards the second upright 108 such that it extends entirely between the first upright 107 and the second upright 108 in a direction substantially perpendicular to the longitudinal direction. In fact, in the embodiment shown in FIGS. 3 to 6, the latch 110 overlaps the second upright 108 by extending adjacent the first external side surface 122 of the second upright 108. In the first position, the latch 110 extends into the gap 124 between the strengthening member 115*b* and the stopper 120. The latch 110 is located in the first position by the stopper 120 because in the first position, a longitudinally facing surface 119 of the latch 110 is configured to abut the stopping surface 121.

In the second position (shown in FIG. 6), the latch 110 extends substantially towards the body 105 in a direction substantially parallel to the longitudinal direction. In the second position, the latch 110 is within the gap 134 between the strengthening member 115*a* and the stopper 130. As the latch 110 moves between the first position and the second position, the latch 110 passes across the first external side surface 132 within the gap 134 and ends up in the second position adjacent the first external side surface 122 of the first upright 107.

In use, the wire holder 101 is attached to a temporary extension arm (not shown). The temporary extension arm is attached to a utility pole such that the longitudinal axis of the wire holder 101 is substantially vertical. A user such as a lineworker, moves the latch 110 to the second position via the handle 111. The lineworker may use a hooked tool which hooks into the aperture 112 of the handle 111 to move the latch to the second position. A wire is subsequently placed in between the first upright 107 and the second upright 108 via the opening 109. Then, the latch 110 is moved (again via the handle 111 and potentially with a hooked tool) to the first position. As a result, the wire is held captive in the region defined by the latch 110, the first upright 107, the second upright 108 and the body 105 of the wire holder 101. To remove the wire, the process is reversed. For example, the latch 110 is moved to the second position (e.g. via the handle 111 and potentially with a hooked tool) and the wire is removed from the wire holder via the opening 109.

Figure 7:
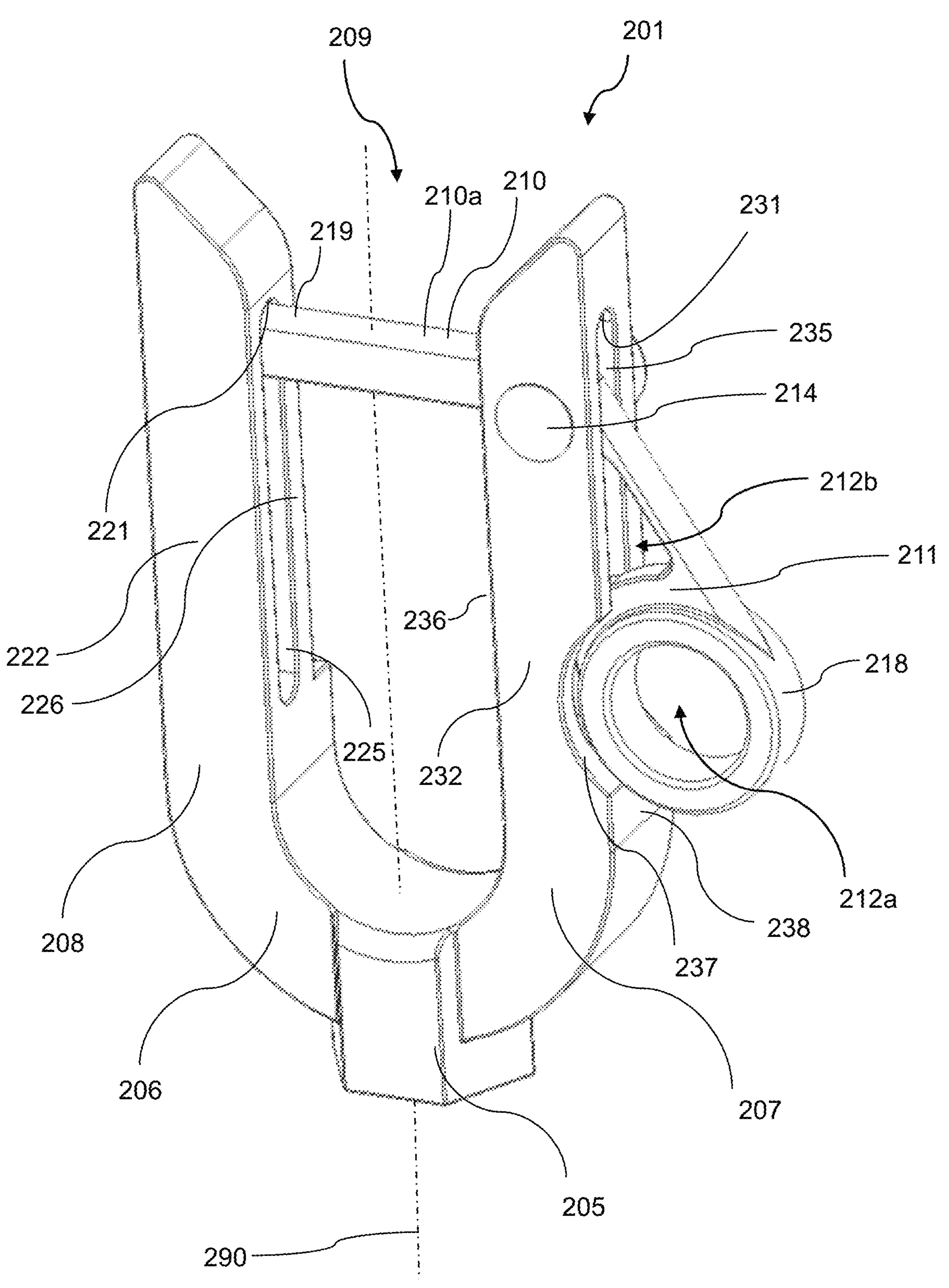
FIG. 7. shows a perspective view of another exemplary a wire holder.

FIG. 7 shows a perspective view of another exemplary wire holder. An optional clamp and insulator are omitted for clarity (known clamps and/or insulators may be used).

The exemplary wire holder in FIGS. 7 to 10 is substantially the same as the exemplary wire holder in FIGS. 3 to 6. Features of the exemplary wire holder in FIGS. 7 to 10 are indicated with three digit numbers beginning with 2, features of the exemplary wire holder in FIGS. 3 to 6 are indicated with three digit numbers beginning with 1. Like features in the two exemplary embodiments are indicated with numbers having the same last two digits.

FIG. 7 shows a wire holder 201 having a body 205, a first upright 207 extending away from the body 205 and a second upright 208 extending away from the body 205 and opposing the first upright 207. A latch 210 is pivotably mounted to the first upright 207. The body 205 has a hexagonal cross-section in the longitudinal direction.

The first upright 207 and the second upright 208 form a frame 206 which is a U-shaped frame having an opening 209 between the first upright 207 and the second upright 208 at an end opposite the body 205. The opening 209 is tapered. The wire holder 201 has a longitudinal axis 290 which extends in a longitudinal direction. The first upright 207 and the second upright 208 respectively extend in the longitudinal direction from opposing sides of the body 205 (which face in a direction substantially parallel to the longitudinal direction). The first upright 207 and the second upright 208 each comprise a respective curve proximate the body 205 such that they extend substantially in the longitudinal direction.

The latch 210 is pivotably mounted at a pivot 214 which is a pin that extends through the latch 210 and the first upright 207. The pivot 214 is spaced from the distal end of the first upright 207. The first upright 207 comprises a slot 235 and the latch 210 is pivotably mounted in the slot 235. The slot 235 is on a second side surface 236 of the first upright 207 which faces the second upright 208. The slot 235 extends entirely through the first upright 207 and has a length in a direction substantially parallel to the longitudinal direction and the first upright 207. The length is greater than the length of the closure portion 210*a* of the latch 210. The width of the slot (perpendicular to the length) is slightly greater than the thickness of the latch 210 such that the latch 110-210 can pivot freely within the slot 235.

The slot 235 has an end face 231 which acts as a stopping surface. The end face 231 is spaced from distal end of the first upright 207.

The second upright 208 also comprises a slot 225 on a second side surface 226 facing the first upright 207. The slot 225 extends entirely through the second upright 208 and substantially corresponds to the slot 235 on the first upright 207. For example, the slot 225 is substantially parallel to the longitudinal direction and has a width and length which correspond to the slot 235 on the first upright 207. The slot 225 also comprises an end face 221 which acts as a stopping surface and which is spaced from the distal end of the second upright 208.

The latch comprises a handle 211 which has an aperture 212*a* which is substantially the same as the aperture 112 described above in respect of the exemplary wire holder in FIGS. 3 to 6. The handle 211 also comprises an aperture 212*b* which substantially conforms to the shape of the handle 211. The aperture 212*b* is a cut-out which provides weight reduction and material savings. The handle 211 is substantially the same as the handle 111 described above in all other respects e.g. has a rim 218 around the aperture 212*a*.

The first upright 207 comprises a concave recess 237 on a third side surface 238 opposite the second side surface 236. The concave recess is configured to receive the distal end of the handle 211 when the latch 210 is in the first position (as shown in FIGS. 7 to 9).

Figure 8:
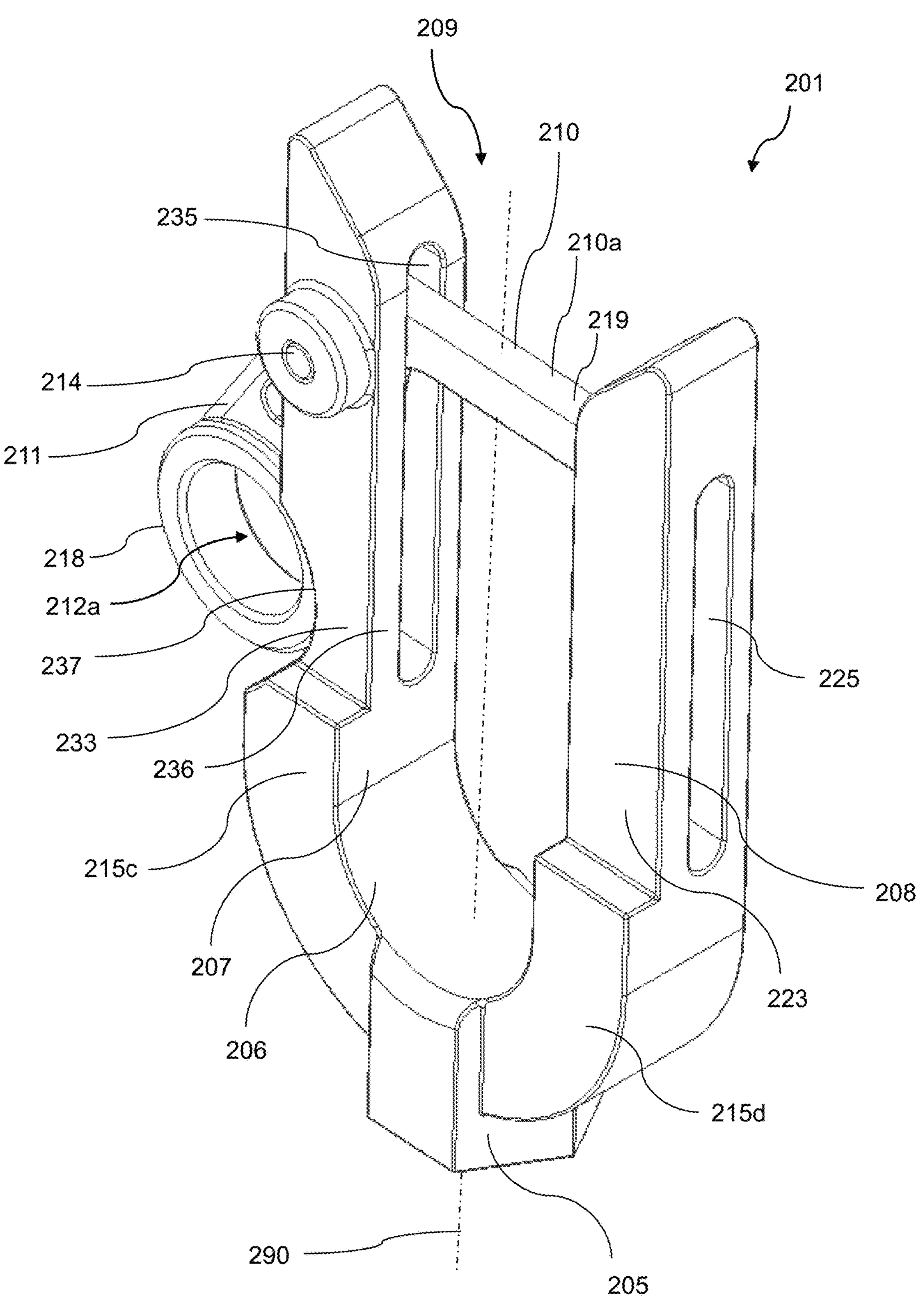
FIG. 8. shows a perspective view of the wire holder shown in FIG. 5 from the opposite side.
Figure 9:
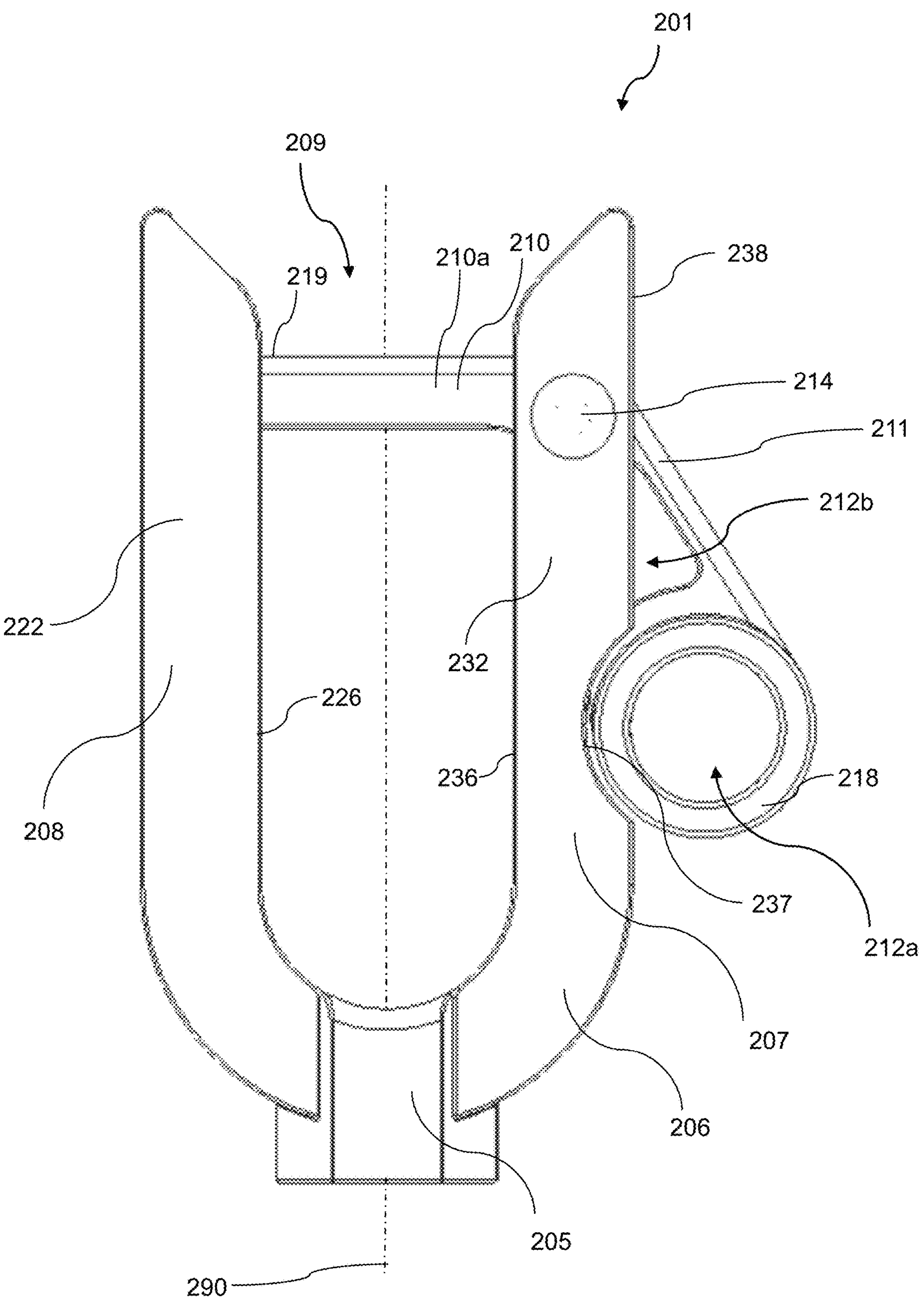
FIG. 9. shows a front view of the wire holder shown in FIG. 5 where the latch is in the first position.

As shown in FIG. 8, the first upright 207 and the second upright 208 comprise respective strengthening members 215*c*, 215*d* on respective sides 223, 233 opposite the respective first external side surfaces 222, 223232. The width of the strengthening member 215*c* on the first upright 207 is the same as the width of the first upright 207 and said strengthening member 215*c* extends partially along the first upright 207 from the body 205. Similarly, the width of the strengthening member 215*d* on the second upright 208 is the same as the width of the second upright 208 and said strengthening member 215*d* extends partially along the second upright 208 from the body 205.

Figure 10:
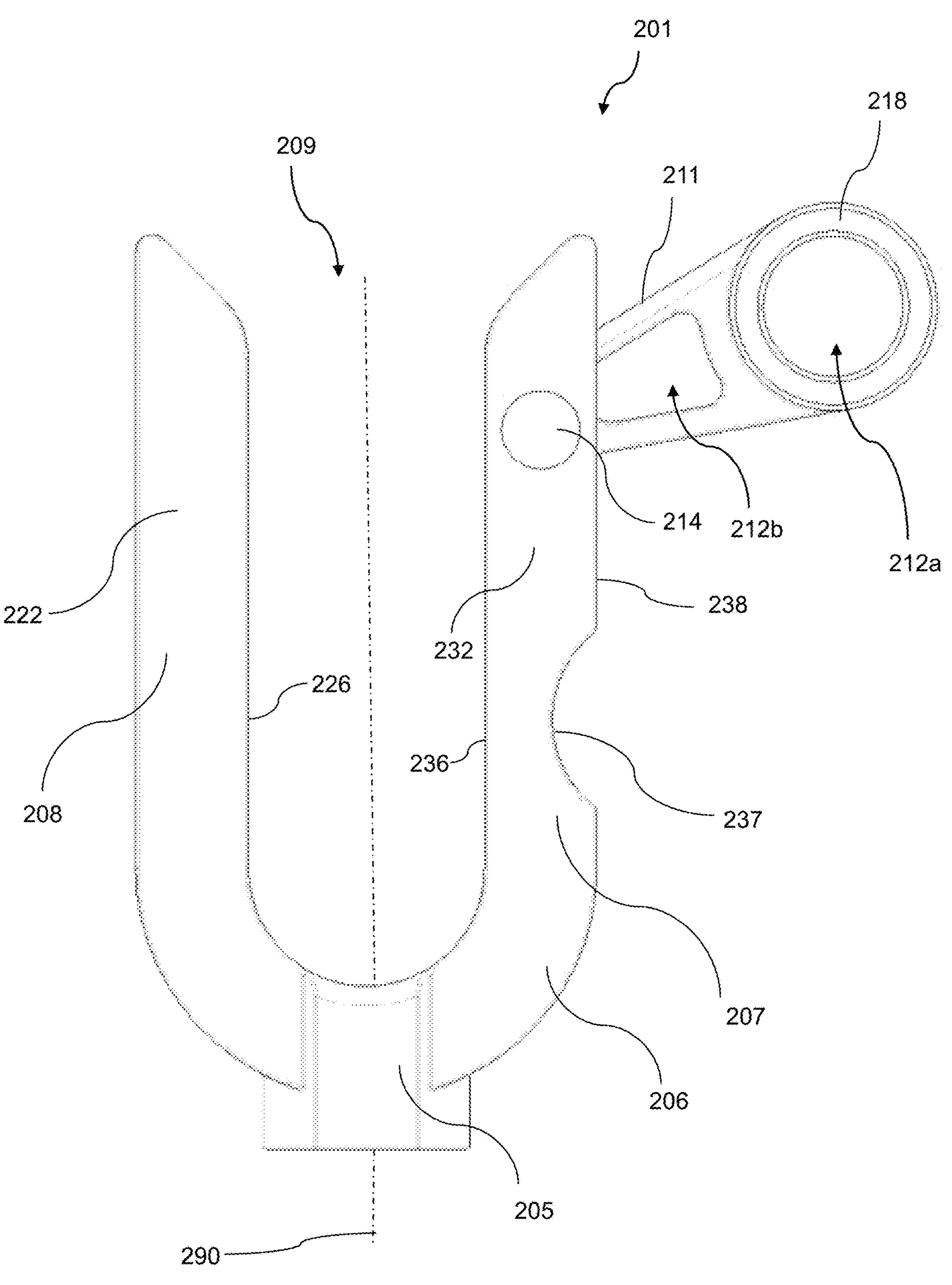
FIG. 10. shows a front view of the wire holder shown in FIG. 5 where the latch is in the second position.

The latch 210 of the wire holder 201 is pivotable between a first position (shown in FIGS. 7 to 9) and a second position (shown in FIG. 10). In the first position, the latch 210 extends from the first upright 207 and into the slot 225 in the second upright 208 such that it extends entirely between the first upright 207 and the second upright 208 and overlaps the second upright 208 (within the slot 225). The latch 210 is located in the first position by the slot 225 in the second upright 208 because, in the first position, a longitudinally facing surface 219 of the latch 210 is configured to abut the end face 221 of the slot 225.

In the second position (show in FIG. 10), the latch 210 extends substantially towards the body 205 in a direction substantially parallel to the longitudinal direction. In other words, the latch 210 extends within the slot 235 on the first upright 207. The wire holder 201 in FIGS. 7 to 10 may be used in substantially the same way as the wire holder 101 in FIGS. 3 to 6.

Presented herein is a wire holder having a latch mounted to a first upright, wherein the latch extends entirely between the first upright and a second upright when in a closed (first) position. In particular, the latch may overlap the second upright. The wire holder presented herein has advantages over known wire holders, in particular, in adverse weather conditions, the risk of a wire escaping the wire holder presented herein is reduced compared to known wire holders.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the spirit and scope of the invention. Further aspects and embodiments will be apparent to those skilled in the art. Any documents mentioned in this text are incorporated herein by reference.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A wire holder for a temporary extension arm comprising:

a body, a first upright extending away from the body, a second upright extending away from the body opposing the first upright, a clamp at an end of the wire holder opposite from the first upright and the second upright, and a latch pivotably mounted to the first upright and configured to be reversibly movable between a first position and a second position, wherein in the first position the latch extends entirely between the first upright and the second upright such that a wire can be held captive between the first upright, the second upright, the body and the latch, in the second position, a gap is provided between the latch and the second upright such that a wire may pass through the gap and into or out of the wire holder, the first upright comprises a stopping surface, and in the second position, the latch is configured to abut the stopping surface.

2. The wire holder according to claim 1 wherein, in the first position, the latch extends between the first upright and the second upright such that the latch overlaps the second upright.

3. The wire holder according to claim 1 wherein the second upright comprises a stopping surface and wherein in the first position, the latch is configured to abut the stopping surface.

4. The wire holder according to claim 3 wherein the second upright comprises a stopper which comprises the stopping surface.

5. The wire holder according to claim 3 wherein the second upright comprises a second upright slot configured to receive a portion of the latch when the latch is in the first position.

6. The wire holder according to claim 5 wherein the second upright slot comprises the stopping face.

7. The wire holder according to claim 1 wherein the first upright comprises a first upright slot and wherein the latch is pivotably mounted in the first upright slot.

8. The wire holder according to claim 1 wherein the latch comprises a handle and wherein the handle comprises more than one aperture.

9. The wire holder according to claim 1 wherein the latch comprises a handle and wherein a distal portion of the handle overlaps the first upright when the latch is in the first position.

10. The wire holder according to claim 1 wherein the latch comprises a handle and the first upright comprises a recess configured to receive a distal portion of the handle when the latch is in the first position.

11. The wire holder according to claim 1 wherein the first upright comprises a strengthening member and wherein said strengthening member extends partially along the first upright such that there is a gap between the strengthening member and a distal end of the first upright configured to receive the latch when in the second position.

12. The wire holder according to claim 1 wherein the second upright comprises a strengthening member and wherein said strengthening member extends partially along the second upright such that there is a gap between the strengthening member and a distal end of the second upright configured to accommodate the latch as the latch moves between the first position and the second position.

13. A system comprising:
- a temporary extension arm; and
- a wire holder according to claim 1 attached to the temporary extension arm.

14. The system according to claim 13 wherein the wire holder is removably attached to the temporary extension arm.

15. A kit of parts comprising:
- a temporary extension arm; and
- one or more wire holders according to claim 1.

16. The wire holder according to claim 1, wherein the clamp is configured to releasably clamp the wire holder to the temporary extension arm.

17. A wire holder for a temporary extension arm comprising:
- a body,
- a first upright extending away from the body,
- a second upright extending away from the body opposing the first upright,
- a clamp at an end of the wire holder opposite from the first upright and the second upright, and
- a latch pivotably mounted to the first upright and configured to be reversibly movable between a first position and a second position, wherein
- in the first position the latch extends entirely between the first upright and the second upright such that a wire can be held captive between the first upright, the second upright, the body and the latch,
- in the second position, a gap is provided between the latch and the second upright such that a wire may pass through the gap and into or out of the wire holder,
- the second upright comprises a stopping surface, and
- in the first position, the latch is configured to abut the stopping surface.

18. A wire holder for a temporary extension arm comprising:
- a body,
- a first upright extending away from the body,
- a second upright extending away from the body opposing the first upright,
- a clamp at an end of the wire holder opposite from the first upright and the second upright, and
- a latch pivotably mounted to the first upright and configured to be reversibly movable between a first position and a second position, wherein
- in the first position the latch extends entirely between the first upright and the second upright such that a wire can be held captive between the first upright, the second upright, the body and the latch,
- in the second position, a gap is provided between the latch and the second upright such that a wire may pass through the gap and into or out of the wire holder,
- the first upright comprises a first upright slot, and
- the latch is pivotably mounted in the first upright slot.

19. A wire holder for a temporary extension arm comprising:
- a body,
- a first upright extending away from the body,
- a second upright extending away from the body opposing the first upright,
- a clamp at an end of the wire holder opposite from the first upright and the second upright, and
- a latch pivotably mounted to the first upright and configured to be reversibly movable between a first position and a second position, wherein
- in the first position the latch extends entirely between the first upright and the second upright such that a wire can be held captive between the first upright, the second upright, the body and the latch,
- in the second position, a gap is provided between the latch and the second upright such that a wire may pass through the gap and into or out of the wire holder,
- the latch comprises a handle, and
- the handle comprises more than one aperture.

20. A wire holder for a temporary extension arm comprising:
- a body,
- a first upright extending away from the body,
- a second upright extending away from the body opposing the first upright,
- a clamp at an end of the wire holder opposite from the first upright and the second upright, and
- a latch pivotably mounted to the first upright and configured to be reversibly movable between a first position and a second position, wherein
- in the first position the latch extends entirely between the first upright and the second upright such that a wire can be held captive between the first upright, the second upright, the body and the latch,
- in the second position, a gap is provided between the latch and the second upright such that a wire may pass through the gap and into or out of the wire holder,
- the latch comprises a handle, and
- the first upright comprises a recess configured to receive a distal portion of the handle when the latch is in the first position.

* * * * *